Patented Nov. 29, 1949

2,489,943

UNITED STATES PATENT OFFICE 2,489,943

DISPERSING AGENTS AND METHOD OF PRODUCING SAME

Thomas L. Wilson, Upper Montclair, and John A. Davison, Waldwick, N. J., assignors to United States Rubber Company, New York, N. Y., a corporation of New Jersey No Drawing. Application September 10, 1947, Serial No. 773,314

18 Claims. (Cl. 260—75)

This invention relates to new dispersing agents and the method of producing the same.

Soaps, and surface-active agents which are sulfates or sulfonates of organic compounds containing at least one group having more than 8 carbon atoms, e. g. alkyl sulfates or sulfonates, sulfated or sulfonated ethers of long and short chain aliphatic groups, sulfated or sulfonated alkyl esters of long chain fatty acids, sulfonated alkyl substituted amides of long chain fatty acids, and alkylated aryl sulfonates, are conventional dispersing agents used in the preparation of various synthetic resins by the so-called emulsion-polymerization process where the polymerizable monomers are polymerized in aqueous emulsion to form an aqueous dispersion of the desired resin, generally called a resin latex, or simply a latex. In such emulsion-polymerization processes, after the desired conversion of polymerizable monomers to polymer has taken place, the unreacted monomers are removed or "stripped" from the latex. Those monomers which are gases are vented from the reactor, whereas residual liquid monomers are distilled from the reaction mixture or latex, as by steam or vacuum distillation. Soaps and the above referred surface-active agents cause a large amount of foaming in the reactor during the stripping operation, particularly when the residual liquid monomers are distilled from the latex. This excessive foaming makes it necessary to conduct the stripping operations very slowly, resulting in a low output of polymer for a given reactor volume and high production costs. A known type of emulsifying agent which does not give excessive foaming in the reactor is the condensation product of formaldehyde with an aryl sulfonic acid or salt thereof, e. g. the sodium salt of naphthalene sulfonic acid or phenol sulfonic acid. While these condensation products have the advantage of reducing or eliminating foaming, they have the disadvantage of discoloring white or colorless or light colored resins on ageing.

According to the present invention, we have produced a new dispersing agent which is non-foaming and which does not impart a discoloration on ageing to white or colorless or light colored synthetic resins.

The dispersing agent of the present invention is a polymeric ester of 2-ethylhexanediol-1,3 and sulfo-succinic acid. The new dispersing agent is prepared by heating the half ester of 2-ethylhexanediol-1,3, and maleic acid to form a maleic alkyd resin, and then reacting the maleic alkyd resin with an alkali bisulfite to form a water-soluble polymeric ester of 2-ethylhexanediol-1,3 and sulfosuccinic acid.

The half ester of 2-ethylhexanediol-1,3 and maleic acid may be prepared by esterifying approximately equi-molar proportions of 2-ethylhexanediol-1,3 and maleic acid or maleic anhydride, generally 0.9 to 1.1 moles of diol per mole of maleic acid or anhydride. A slight excess of the diol, about 1.05 moles per mol of the maleic acid or anhydride, is preferred. The reaction is exothermic at the start and the temperature may be regulated within suitable limits, such as between 90 and 130° C. by controlled addition of the diol. When all the diol has been added, heat may be applied to drive off any water formed by the esterification.

The maleic alkyd resin is formed from the half ester of the 2-ethylhexanediol-1,3 and maleic acid by heating the ester at a suitable temperature, as from 130 to 180° C. or higher until the desired degree of condensation polymerization has been obtained. The degree of condensation and progress of the polymerization may be followed, as is well known, by titrating the total acidity of the alkyd at any stage of the polymerization. A convenient way is to determine the acid values, i. e. the number of milligrams of KOH to neutralize 1 gram of the alkyd, as the polymerization progresses. The acid value of the half-ester of 2-ethylhexanediol-1,3 and maleic acid at the start of the condensation polymerization is 229. In order to obtain the maleic alkyd resin for preparing an emulsifying agent having the maximum advantages of the present invention, the condensation polymerization of the ester should proceed at least to the extent represented by an acid value as low as 80, and preferably to an acid value from 40 to 50. The heating may, however, be continued to carry the condensation polymerization to an even lower acid value, as low as 10, and still obtain a maleic alkyd resin which can be transformed into an emulsifying agent according to the present invention. However, with acid values as low as 10 to 20, it may be desirable or necessary to add a known inhibitor of gelation, e. g. para tertiary butyl catechol, since the maleic alkyd resins of the very high molecular weight represented by such low acid values as 10 to 20, may have a tendency to gel. The techniques for forming alkyd resins generally are well known, see for example, "Colloid Chemistry," vol. VI, by Jerome Alexander, the chapter on "Alkyd Resins," pages 1042–1047 and the chapter on "Fumaric and Maleic Resins," pages 1068–1076. The specific maleic alkyd resin which is the condensation polymer of 2-ethylhexanediol-1,3 and maleic acid is disclosed and claimed in an application of Charles A. Heiberger, Serial No. 760,103, filed July 10, 1947.

The polymeric ester of 2-ethylhexanediol-1,3 and sulfosuccinic acid dispersing agent of the present invention is prepared from the condensation polymer of 2-ethylhexanediol-1,3 and maleic acid by reacting the maleic alkyd resin with an aqueous solution of a bisulfite, such as an alkali-metal or ammonium bisulfite, at an elevated temperature in a suitable corrosion resistant pressure vessel, such as a glass lined autoclave, or a vessel equipped with a reflux condenser for condensing and returning $SO_2$. The sulfonation is conveniently carried out at a temperature of 80 to 110° C. in the presence of about one mole of bisulfite per mole equivalent of the maleic alkyd resin (i. e. per mole of the half-ester of 2-ethylhexanediol-1,3 and maleic acid, or per mole of the maleic acid or the maleic anhydride used in the formation of the resin). In order to obtain an emulsifying agent having the maximum advantages of the present invention, the sulfonation reaction should be carried to at least 70% sulfonation of the maleic alkyd resin, i. e. until 0.7 to 1 mole of bisulfite has reacted per mole equivalent of maleic alkyd resin. The preferred degree of sulfonation is from 85% to 100%, i. e. from 0.85 to 1 mole of bisulfite reacted per mole equivalent of maleic alkyd resin. The progress of the sulfonation may be followed by withdrawing samples of the reaction mixture from time to time and determining the quantity of unreacted bisulfite present in the sample by titration with iodine, the amount of bisulfite added to the maleic acid alkyd being known. Instead of adding the entire amount of bisulfite at the start, the bisulfite may be added in increments as the sulfonation of the maleic alkyd resin proceeds. On completion of the desired degree of sulfonation, the sulfonation reaction may be stopped by discontinuing the heating, and unreacted sulfur dioxide may be vented off while the reaction mixture is still hot.

The following example shows in detail how the preparation of the dispersing agent of the present invention may be carried out in practice, and is intended to illustrate but not restrict the invention. The parts referred to therein are by weight.

Example A 98 parts of maleic anhydride are charged into a glass-lined reaction vessel equipped with a stirrer, reflux condenser, thermometer, an inlet tube for nitrogen and a heating jacket. Water is run through the reflux condenser and a blanket of nitrogen is maintained over the maleic anhydride. The charge is heated to about 90° C., and heating is then discontinued. 2-ethylhexanediol-1,3 is added slowly through the condenser while the reaction mixture is stirred vigorously. An exothermic reaction occurs. The temperature of the charge is kept between 90° C. and 130° C. by regulating the rate of addition of the 2-ethylhexanediol-1,3. After about 77 parts of the diol are added, the reaction is less vigorous and 77 more parts of the diol may be added relatively quickly with the resultant formation of the half ester of 2-ethylhexanediol-1,3 and maleic acid. Steam is then introduced into the jacket of the condenser in place of water, and the reaction vessel is heated. The temperature is raised slowly from 130° C. to 180° C. over a period of several hours to maintain vigorous boiling off of water formed during the condensation polymerization. The mixture is stirred rapidly to prevent local overheating. The progress of the condensation polymerization is followed by removing sample and determining the acid value by titration with a standard alkali solution. Heating is continued for eight hours until an acid value of 40 is obtained. The resulting 226 parts of alkyd is poly 2-ethylhexanediol-1,3 maleate, a glass-like white solid at room temperature. A small amount of xylene (about 30 parts) is added after the reaction mixture has cooled below 80° C., but before it becomes completely cold, to facilitate subsequent handling operations. The 226 parts of the maleic alkyd resin thus obtained with the 30 parts of added xylene are charged into an evacuated glass-lined pressure vessel, equipped with a stirrer, thermometer, agitator, and heating jacket. 94.5 parts of sodium bisulfite in 94.5 parts of water are added. The charge is heated to about 98° C., and the temperature is maintained at about 98° C., samples being withdrawn at intervals of six hours and the unreacted sodium bisulfite determined by titration with a standard iodine solution. After heating for 46 hours, about 99.3% of the sodium bisulfite had reacted. The xylene and unreacted sulfur dioxide are removed by venting while the reaction mixture is still hot. The product is an aqueous solution of the sodium salt of the polymeric ester of 2-ethylhexanediol-1,3 and sulfosuccinic acid which may be diluted to any desired concentration, or which may be evaporated to give the sodium salt of the polymeric sulfonated ester.

The dispersing agents of the present invention are especially valuable in the preparation of white or colorless or light-colored synthetic resins by the emulsion polymerization process where in the subsequent use of the latex itself, as in impregnating and coating fabrics, paper and the like, or in the subsequent use of the coagulated and dried resin, as in casting, molding, sheeting, lacquer preparation and the like operations, it is desired to make a product that will not discolor on ageing. The dispersing agents of the present invention are also valuable in emulsion-polymerization processes for preparing synthetic resins and synthetic rubbers generally where the products may be dark colored. Examples of resins in the manufacture of which the dispersing agents of the present invention are of value are the polymers of one or a mixture of polymerizable monomers containing a terminal $CH_2=C<$ group where at least one of the disconnected valences is attached to an electronegative radical, that is, a radical which substantially increases the electrical dissymmetry or polar character of the molecule, e. g. phenyl, halogen, nitrile, acetoxy, and carboxy radicals, and the polymers of mixtures of one or more such polymerizable monomers containing a terminal $CH_2=C<$ group with isobutylene. Many of such resins are white or colorless or light-colored, and such is where the dispersing agents of the present invention are of particular value. Examples of such polymerizable monomers containing a terminal $CH_2=C<$ group are arylolefins, e. g. styrene, vinyl naphthalene, alpha-methyl styrene, p-methyl styrene, p-chlorostyrene, dichlorostyrenes; the alpha methylene carboxylic acids, and their esters, nitriles and amides, e. g. acrylic acid, methacrylic acid, methyl acrylate, methyl methacrylate, methyl ethacrylate, ethyl acrylate, ethyl methacrylate, ethyl ethacrylate, acrylonitrile, methacrylonitrile, acrylamide, methacrylamide; vinyl esters of alkanoic acids, e. g. vinyl formate, vinyl acetate, vinyl propionate, vinyl butyrate; vinyl pyridene; vinyl chloride; vinylidene chloride; alkyl vinyl ethers, e. g. methyl vinyl ether, ethyl vinyl ether; alkyl vinyl ketones, e. g. methyl vinyl ketone, ethyl ketone. Other examples of resins which may be prepared by emulsion-polymerization processes using the dispersing agent of the present invention are polymers of mixtures of one or more polymerizable monomers containing a terminal $CH_2=C<$ group where at least one of the disconnected valences is attached to an electronegative radical, with one or more conjugated diolefines, such as butadienes-1,3, e. g. butadiene-1,3, methyl-2-butadiene-1,3 (isoprene), chloro-2-butadiene-1,3 (chloroprene), piperylene, 2,3-dimethyl-butadiene-1,3. Further examples of such resins are polymers of one or a mixture of such conjugated diolefines. Such polymers of butadienes-1,3 and mixtures of butadienes-1,3 with generally a minor proportion of such polymerizable monomers containing a terminal $CH_2=C<$ group are so-called synthetic rubbers. The dispersing agents of the present invention are also useful in preparing emulsions and other dispersions generally, such as of liquid or solid resins, elastomers, waxes, pitches, mineral or vegetable oils, various chemicals, coating compositions, coloring matters.

In applying the dispersing agents of the present invention to the emulsion polymerization of resin forming polymerizable monomers, the resin forming monomers and generally a conventional catalyst are emulsified in water with a small amount of the polymeric ester of 2-ethylhexanediol-1,3 and sulfosuccinic acid as an emulsifying agent, and the emulsion is subjected to the usual polymerizing conditions for the particular monomers used. From 0.5 to 10% of the polymeric ester of 2-ethylhexanediol-1,3 and sulfosuccinic acid, based on the weight of polymerizable material in the emulsion, will generally be found to be suitable, 1 to 5% being preferred. Larger amounts than 10% are ordinarily unnecessary, but may be used. In emulsion-polymerizations under acid conditions the sulfo ($-SO_3H$) groups of the polymeric ester of 2-ethylhexanediol-1,3 and sulfosuccinic acid will of course not be neutralized. In alkaline emulsion-polymerization processes, the sulfo groups will be neutralized to form salts, such as the alkali-metal, ammonium or substituted ammonium (amine) salts, generically referred to as alkali salts, viz. $-SO_3M$, where M is alkali-metal, ammonium or substituted ammonium radical. In the large proportion of its uses as a dispersing agent, the polymeric ester of 2-ethylhexanediol-1,3 and sulfosuccinic acid will be in the form of its sodium salt.

A synthetic resin emulsion-polymerization process for which the dispersing agent of the present invention was particularly developed is the emulsion polymerization of acrylonitrile and isobutylene. Emulsion-polymerizates of a mixture of acrylonitrile and isobutylene have been used to treat fabrics to impart various desirable properties thereto including a stiffening action which is retained to a great extent after washing. The resin deposit on the fabric is clear and colorless, but difficulties have appeared with known emulsifying agents either in the foaming of the resin dispersion in the reactor on stripping the acrylonitrile, or in discoloration on ageing of the fabric where known non-foaming dispersing agents have been used. The treatment of textile material with such aqueous emulsion polymerizates of acrylonitrile and isobutylene is described and claimed in an application of John S. Kurleychek, Serial No. 712,727, filed November 27, 1946.

As disclosed in the Kurleychek application, the resin for treating textile material may be prepared by the aqueous emulsion polymerization of a mixture of acrylonitrile and isobutylene in the presence of an emulsifying agent and a peroxide type catalyst, such as hydrogen peroxide, alkali persulfates or percarbonates, benzoyl peroxide, acetyl peroxide, tertiary butyl hydroxyperoxide, and in the presence or absence of a polymerization regulator such as dodecyl mercaptan which acts to control the length of the polymer chain. The emulsion polymerization will take place slowly at room temperature, but it is advantageous to polymerize by heating at a higher temperature as from 25° C. to 100° C., the time of polymerization being from 1 to 100 or more hours, depending on the temperature, particular catalyst used, and degree of polymerization desired.

The acrylonitrile in the aqueous emulsion may be from 10 to 90% by weight and the isobutylene correspondingly 90 to 10% by weight of the mixture of the acrylonitrile and isobutylene. The weight ratio of water to the acrylonitrile and isobutylene present in the initial emulsion is not critical, the ratio used depending on the concentration of solids desired in the final emulsion polymerizate. The weight ratio of water to acrylonitrile and isobutylene in the initial emulsion may be from 1:1 to 10:1. The concentration of synthetic resin in the aqueous dispersion as it may be used in the treatment of textile materials is generally from 0.5 to 25% by weight, which with a 100% wet pickup as in a conventional padder, will give a dried resin deposit of 0.5 to 25% of the weight of the goods. The resulting emulsion polymerizates may be readily diluted with water to the desired textile treating concentrations. Copolymers prepared by the aqueous emulsion polymerization of mixtures of acrylonitrile and isobutylene containing 10 to 90% by weight of such mixtures of acrylonitrile give copolymers, the analyses of which show 66 to 80% by weight acrylonitrile.

The treatment of textile material with aqueous dispersions of copolymers of acrylonitrile and isobutylene prepared by emulsion polymerization of such mixtures of the acrylonitrile and isobutylene is extremely simple. All that is necessary is to apply the copolymer dispersion to the textile material in the desired manner, as by immersing the fabric, thread or other article of textile material in the dispersion of the copolymer, removing from the bath, squeezing out excess of dispersion from the textile material, and drying. Fabrics may be treated in conventional padding apparatus where the fabric passes through the treating bath, or the dispersion of copolymer may be applied to the fabric by a conventional spreader bar, doctor blade, spray applicator, or the like. The treated textile material may be dried in conventional drying apparatus. The textile material is heated to a temperature sufficient to soften the dried deposited particles of acrylonitrile-isobutylene synthetic resin to firmly bind the particles to the fibers of the textile material and to adjacent particles. Such heating temperature should be between 180° F. and 360° F. The drying apparatus may reach the desired heating temperature, or the treated textile material may be dried at lower temperature, as from room temperature to less than 180° F., and then heated to between 180° F. and 360° F. In the case of fabrics, ironing the thus treated fabric, as by passing through conventional fabric finishing rolls, is desirable to give additional stiffening action.

The resin treatment may be applied to textile material made of various types of fibers or mixtures, such as cotton, nylon, rayon, silk, and wool, and is particularly adapted to the treatment of fabrics comprising cellulosic fibers, such as cotton, and rayon (e. g., viscous rayon, cuprammonium rayon, and acetate rayon).

Where soaps, or sulfates or sulfonates of organic compounds containing at least one group having more than 8 carbon atoms were used as dispersing agents in the emulsion-polymerization of mixtures of acrylonitrile and isobutylene, a large amount of foaming occurred in the reactor when the unreacted monomers, particularly the acrylonitrile, were removed after polymerization. Known surface active agents used in the emulsion-polymerization of mixtures of acrylonitrile and isobutylene, which although they do not cause discoloration of the resin product, do cause excessive foaming during the stripping operation, particularly with removal of the residual monomeric acrylonitrile, are the alkyl esters of sulfosuccinic acid, as represented for example, by the sodium salt of dioctylsulfosuccinate. It has been found that stripping of unreacted acrylonitrile monomer by steam distillation after venting of the unreacted isobutylene monomer from a 600 gallon batch of an emulsion-polymerizate of acrylonitrile and isobutylene made with such emulsifying agents commonly took as long as twelve or more hours because of excessive foaming of the mixture. Dispersing agents which are the condensation products of an aryl sulfonic acid, e. g. naphthalene sulfonic acid, with formaldehyde, when used as emulsifying agents for the acrylonitrile and isobutylene, do not cause appreciable foaming during removal of unreacted monomers, but they are unsatisfactory for preparing the acrylonitrile-isobutylene resin latex for textile treatment because fabrics treated with the latex containing such dispersing agents become discolored on ageing, white fabrics becoming yellow particularly on exposure to sunlight.

The polymeric ester of 2-ethylhexanediol-1,3 and sulfosuccinic acid of the present invention when used to emulsify acrylonitrile and isobutylene in aqueous emulsion-polymerization processes gives an emulsion polymerizate that does not foam on stripping of the unreacted monomers and that does not cause a discoloration on ageing of textile material treated with the emulsion-polymerizate. The residual acrylonitrile monomer may be steam distilled from a 600 gallon batch of such emulsion polymerizate in less than three hours. The dispersing agents of the present invention are thus very different from the sulfosuccinic acid esters of monohydric alcohols, such as the octyl succinates, which cause excessive foaming, as above described. The polymeric esters of 2-ethylhexanediol-1,3 and sulfosuccinic acid of the present invention are also very different from the known sulfosuccinic acid esters of such polyhydric alcohols as ethylene glycol, propylene glycol, butylene glycol, glycerine, and pentaerythrite which are known to be effective wetting agents, but which are ineffective as emulsifying and dispersing agents, as in the emulsion-polymerization of acrylonitrile-isobutylene synthetic resins.

The following example shows in detail the preparation of an emulsion-polymerizate of acrylonitrile and isobutylene with the dispersing agent of the present invention and the treatment of fabric with the same, and is intended to illustrate but not restrict the invention. The parts referred to therein are by weight.

*Example B*

An autoclave reactor is charged with 150 parts of water, 3 parts of the sodium salt of the polymeric ester of 2-ethylhexanediol-1,3 and sulfosuccinic acid prepared as described in Example A above, as emulsifying and dispersing agent, 0.5 part of potassium persulfate as catalyst, 1 part of dodecyl mercaptan as regulator, and 65 parts of acrylonitrile, after which 35 parts of isobutylene are introduced into the reactor in the form of a liquid under pressure. The charge is polymerized by agitating and heating at 50° C. for 18 hours. No flocculation of polymer occurred during the reaction. The reactor is cooled to room temperature, the unreacted isobutylene is vented off as a gas without any trouble from foaming of the latex. The unreacted acrylonitrile is removed rapidly by steam distillation at reduced pressure (about 100 mm.) without difficulty from foaming of the latex. The conversion of monomers to copolymer is about 80%. The copolymer analyzed 19.3% nitrogen, which calculates to 73% acrylonitrile in the copolymer. The latex remained stable for a storage period of six months.

Cotton print cloth (80 x 80 count; weight 3 oz. per sq. yd.) which had been desized, mercerized, singed and calendered, was treated with the above emulsion polymerizate which was diluted with water to 10% solids content. The fabric was impregnated with the dispersion by running through a bath, the squeeze rollers of which were regulated to give approximately 100% pick-up of the bath and dried at room temperature. No flocculation of the latex occurred in the bath. The fabric was then given a couple of passes with an iron heated to about 260° F. The treated fabric showed increased abrasion resistance, stiffness and bursting strength and had a firm, full hand in contrast to the limp and "hungry" feel of the untreated fabric. In addition, a certain amount of springiness and crush resistance was evident in the treated fabric. Exposure of the treated fabric in a Fadeometer for 80 hours did not result in yellowing of the fabric.

In view of the many changes and modifications that may be made without departing from the principles underlying the invention, reference should be made to the appended claims for an understanding of the scope of the protection afforded the invention.

Having thus described our invention, what we claim and desire to protect by Letters Patent is:

1. A polymeric ester of 2-ethylhexanediol-1,3 and sulfosuccinic acid reaction product of an alkali bisulfite and a polymeric maleic-half ester of 2-ethylhexanediol-1,3 alkyd resin having an acid value from 40 to 50.

2. A polymeric ester of 2-ethylhexanediol-1,3 and sulfosuccinic acid reaction product of 0.7 to 1 mole of an alkali bisulfite per mole equivalent of a polymeric maleic-half ester of 2-ethylhexanediol-1,3 alkyd resin having an acid value from 40 to 50.

3. A polymeric ester of 2-ethylhexanediol-1,3 and sulfosuccinic acid reaction product of 0.85 to 1 mole of an alkali bisulfite per mole equivalent of a polymeric maleic-half ester of 2-ethylhexanediol-1,3 alkyd resin having an acid value from 40 to 50.

4. The method of producing a polymeric ester of 2-ethylhexanediol-1,3 and sulfosuccinic acid dispersing agent which comprises heating the half ester of 2-ethylhexanediol-1,3 and maleic acid to form a maleic alkyd resin having an acid value from 40 to 50, and reacting said maleic alkyd resin with a bisulfite.

5. The method of producing a polymeric ester of 2-ethylhexanediol-1,3 and sulfosuccinic acid dispersing agent which comprises heating the half ester of 2-ethylhexanediol-1,3 and maleic acid to form a maleic alkyd resin having an acid value from 40 to 50, and reacting said maleic alkyd resin with a bisulfite until 0.7 to 1 mole of bisulfite has reacted per mole equivalent of maleic alkyd resin.

6. The method of producing a polymeric ester of 2-ethylhexanediol-1,3 and sulfosuccinic acid dispersing agent which comprises heating the half ester of 2-ethylhexanediol-1,3 and maleic acid to form a maleic alkyd resin having an acid value from 40 to 50, and reacting said maleic alkyd resin with a bisulfite until 0.85 to 1 mole of bisulfite has reacted per mole equivalent of maleic alkyd resin.

7. An aqueous dispersion of water-insoluble material containing a polymeric ester of 2-ethylhexanediol-1,3 and sulfosuccinic acid reaction product of an alkali bisulfite and a polymeric maleic-half ester of 2-ethylhexanediol-1,3 alkyd resin having an acid value from 40 to 50.

8. The process which comprises polymerizing in aqueous emulsion resin-forming polymerizable monomers, said emulsion containing as a dispersing agent a polymeric ester of 2-ethylhexanediol-1,3 and sulfosuccinic acid reaction product of an alkali bisulfite and a polymeric maleic-half ester of 2-ethylhexanediol-1,3 alkyd resin having an acid value from 40 to 50.

9. The process which comprises polymerizing in aqueous emulsion resin-forming polymerizable monomers, said emulsion containing as a dispersing agent a polymeric ester of 2-ethylhexanediol-1,3 and sulfosuccinic acid, as claimed in claim 2.

10. The process which comprises polymerizing in aqueous emulsion a mixture of acrylonitrile and isobutylene, said emulsion containing as a dispersing agent a polymeric ester of 2-ethylhexanediol-1,3 and sulfosuccinic acid.

11. The process which comprises polymerizing in aqueous emulsion a mixture of acrylonitrile and isobutylene, said emulsion containing as a dispersing agent a polymeric ester of 2-ethylhexanediol-1,3 and sulfosuccinic acid, and thereafter removing unreacted monomeric isobutylene and acrylonitrile from the aqueous dispersion of polymeric material.

12. The process which comprises polymerizing in aqueous emulsion a mixture of acrylonitrile and isobutylene, said emulsion containing as a dispersing agent a polymeric ester of 2-ethylhexanediol-1,3 and sulfosuccinic acid as claimed in claim 2, and thereafter removing unreacted monomeric isobutylene and acrylonitrile from the aqueous dispersion of polymeric material.

13. An aqueous dispersion of water-insoluble synthetic resin containing a polymeric ester of 2-ethyl-hexanediol-1,3 and sulfosuccinic acid reaction product of an alkali bisulfite and a polymeric maleic-half ester of 2-ethylhexanediol-1,3 alkyd resin having an acid value from 40 to 50.

14. An aqueous dispersion of water-insoluble synthetic resin containing a polymeric ester of 2-ethylhexanediol-1,3 and sulfosuccinic acid, as claimed in claim 2.

15. An aqueous emulsion polymerizate of a mixture of acrylonitrile and isobutylene, and containing a polymeric ester of 2-ethylhexanediol-1,3 and sulfosuccinic acid.

16. An aqueous emulsion polymerizate of a mixture of acrylonitrile and isobutylene, and containing a polymeric ester of 2-ethylenehexanediol-1,3 and sulfosuccinic acid, as claimed in claim 2.

17. Textile material having deposited directly thereon solids of an aqueous emulsion polymerizate of a mixture of acrylonitrile and isobutylene, said emulsion polymerizate containing a polymeric ester of 2-ethylhexanediol-1,3 and sulfosuccinic acid.

18. Textile material having deposited directly thereon solids of an aqueous emulsion polymerizate of a mixture of acrylonitrile and isobutylene, said emulsion polymerizate containing a polymeric ester of 2-ethylhexanediol-1,3 and sulfosuccinic acid, as claimed in claim 2.

THOMAS L. WILSON.
JOHN A. DAVISON.

REFERENCES CITED

The following references are of record in the file of this patent:

UNITED STATES PATENTS

| Number | Name | Date |
|---|---|---|
| 2,028,091 | Jaeger | Jan. 14, 1936 |
| 2,376,014 | Semon et al. | May 15, 1945 |